United States Patent
Hubbe et al.

(10) Patent No.: US 6,341,228 B1
(45) Date of Patent: Jan. 22, 2002

(54) METHOD OF PARAMETERIZING THE DISPLAY ON MOBILE RADIO COMMUNICATIONS EQUIPMENT CO-OPERATING WITH A SUBSCRIBER IDENTITY MODULE

(75) Inventors: Pascal Hubbe, Paris; Frédéric Vasnier, Colombes, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/286,842

(22) Filed: Apr. 6, 1999

(30) Foreign Application Priority Data

May 7, 1998 (FR) .............................. 98 05834

(51) Int. Cl.[7] ................................ H04Q 7/20
(52) U.S. Cl. ........................ 455/566; 455/558
(58) Field of Search ................ 455/90, 922, 550, 455/558, 566, 575; 379/357

(56) References Cited

U.S. PATENT DOCUMENTS

| | | | | |
|---|---|---|---|---|
| 6,049,697 A | * | 4/2000 | Scozzarella et al. | 455/566 |
| 6,073,034 A | * | 6/2000 | Jacobsen et al. | 455/566 |
| 6,073,036 A | * | 6/2000 | Heikkinen et al. | 455/575 |
| 6,078,820 A | * | 6/2000 | Wells et al. | 455/566 |
| 6,091,956 A | * | 7/2000 | Hollenberg | 455/566 |
| 6,097,964 A | * | 8/2000 | Nuovo et al. | 455/550 |
| 6,104,924 A | * | 8/2000 | Shirai | 455/566 |
| 6,138,039 A | * | 10/2000 | Sudo et al. | 455/566 |
| 6,173,194 B1 | * | 1/2001 | Vanttila | 455/566 |

FOREIGN PATENT DOCUMENTS

EP 8 802 658 A2 10/1997

OTHER PUBLICATIONS

"GSM: Digital Cellular Telecommunications Systems (Phase 2+); Specification of the SIM Application Toolkit for the Subscriber Identity Module—Mobile Equipment (SIM–ME) Interface" GSM Technical Specification 11.14, Jul. 1997 pp. 1–5, 07, 09–56 XP002064640.

\* cited by examiner

Primary Examiner—Nay Maung
(74) Attorney, Agent, or Firm—Sughrue Mion, PLLC

(57) ABSTRACT

A method of parameterizing the display on display means associated with a piece of radiocommunications mobile equipment co-operating with a subscriber identity module, the method having the following steps in order:

said subscriber identity module sends a set of commands to said mobile equipment, said commands enabling the display on said display means to be parameterized; and said commands are executed by said mobile equipment on said display means.

11 Claims, 2 Drawing Sheets

1

METHOD OF PARAMETERIZING THE DISPLAY ON MOBILE RADIO COMMUNICATIONS EQUIPMENT CO-OPERATING WITH A SUBSCRIBER IDENTITY MODULE

FIELD OF THE INVENTION

The present invention relates to a radiocommunications system, in particular of the GSM type (global system for mobile communications), of the DCS type (digital cellular system), or of the PCS type (personal communication system).

More particularly, the invention relates to a method enabling best advantage to be taken of the display means associated with a piece of mobile radiocommunications equipment that co-operates with a subscriber identity module.

BACKGROUND OF THE INVENTION

The GSM recommendations of the ETSI (European Telecommunication Standards Institute) recommend using a subscriber identity module (SIM) for storing both data specific to the user and data relating to the additional services which are supplied to the radiocommunications terminal.

ETSI recommendation GSM 11.11 and entitled Digital cellular telecommunications system (phase 2+); specification of the subscriber identity module—mobile equipment (SIM-ME) interface defines the interface between the subscriber identity module (SIM) and the radiocommunications mobile equipment (ME).

ETSI recommendation GSM 11.14 entitled Digital cellular telecommunications system (phase 2+); specification of the SIM application tool kit for the subscriber identity module—mobile equipment (SIM-ME) interface defines the way in which applications (or services) stored in the subscriber identity module (SIM) are to communicate with the radiocommunications mobile equipment (ME).

In particular, that recommendation describes a set of functions known as proactive functions that the SIM can send to the ME.

The additional services which are stored in the SIM can be of various kinds and of various levels. As examples, mention can be made of the following:

a service for storing data of the telephone directory type; and a service for sending and receiving short alphanumeric messages (SMS for short message service).

The advantage of operating in that way is to make services independent of equipment type. It is then possible to make use of the services offered by a SIM from any piece of radiocommunications mobile equipment, i.e. independently of its manufacturer.

Thus, for example, the SIM can send a function which consists in displaying a menu on the screen of the terminal, from which menu the user can select an option.

The way in which the various options on offer are displayed on the screen is not specified by the function as sent by the SIM. It is the ME which takes charge of display management.

Nevertheless, the display capabilities of recent generations of mobile terminals are becoming most advantageous, and in particular they provide displays of high resolution (e.g. 15 lines of 15 columns).

The state of the art is becoming inadequate for enabling an application to manage that amount of display space.

In particular, an application which is given that amount of display space to use may desire to manage it itself rather than allow the ME to make its own decisions.

OBJECT AND SUMMARY OF THE INVENTION

The object of the present invention is thus to enable the SIM to parameterize the display so as to give applications greater freedom to make use of the display means associated with an ME.

The invention provides a method of parameterizing the display on display means associated with a piece of radiocommunications mobile equipment co-operating with a subscriber identity module, the method having the following steps in order:

said subscriber identity module sends a set of commands to said mobile equipment, said commands enabling the display on said display means to be parameterized; and said commands are executed by said mobile equipment on said display means.

In order to implement this method, the invention also provides a radiocommunications system including a subscriber identity module co-operating with a piece of mobile equipment possessing display means, said subscriber identity module possessing means for sending a set of commands enabling the display on said display means to be parameterized, and said piece of mobile equipment possesses means for executing said commands on said display means.

BRIEF DESCRIPTION OF THE DRAWINGS

Other characteristics and advantages of the invention will appear on reading the following description of a preferred embodiment of the invention given by way of non-limiting indication and with reference to the accompanying drawings, in which.

MORE DETAILED DESCRIPTION

This description is made in the context of ETSI recommendations GSM 11.11 and GSM 11.14. Nevertheless, the person skilled in the art can naturally extend this particular implementation to other radiocommunications systems.

Figure 1:
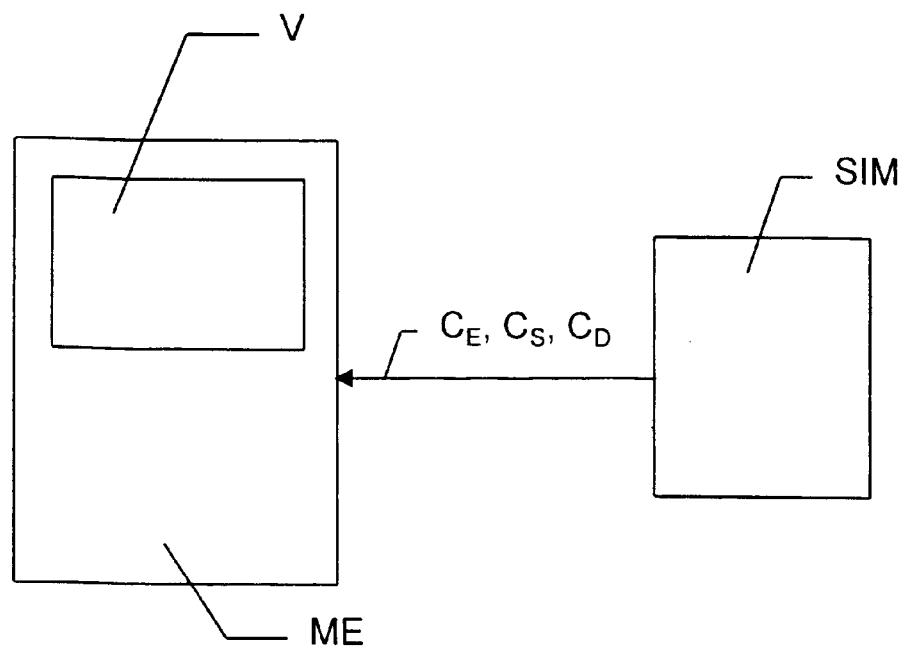
FIG. 1 shows a radiocommunications system constituting a particular embodiment of the invention, and comprising a subscriber identity module and a piece of mobile equipment.

In accordance with recommendation GSM 11.11 and as shown in FIG. 1, a radiocommunications terminal is made up of a subscriber identity module SIM and a piece of mobile equipment ME.

The communications protocol and the interface between these two elements are described by recommendation GSM 11.11 for general aspects and recommendation GSM 11.14 for the various functions that the SIM can send to the ME.

In those recommendations, the protocol is of the master/slave type, with the ME always having the role of master. This means, in particular, that the SIM can transmit a command to the ME only at the request of the ME.

The mechanism whereby the SIM sends a command to the ME is described more precisely in paragraph 6.1 of recommendation GSM 11.14: when the ME sends a command to the SIM, the SIM returns a result message which includes a status field.

A certain value in the status field informs the ME that the SIM seeks to send a "proactive" command. At that moment, the ME issues a special FETCH command which recovers the proactive command.

In an implementation of the invention, a new "activation" command $C_E$ is added to the set of proactive commands of the SIM in order to enable the display means to be divided into one or more display areas.

This command can have several parameters.

A first parameter can be the number of display areas.

A second parameter can specify the positions of the various display ares. In particular, the second parameter can specify whether the areas extend horizontally or vertically.

A third parameter can specify the sizes of the various display areas.

A fourth parameter can, in particular, specify the appearance of the borders around the display areas. In particular, it can indicate whether or not the display areas are to have a visible border. Optionally, this parameter or some other parameter can specify the type of border that is to be displayed (border thickness, single or double lines, . . . ).

Figure 2A:
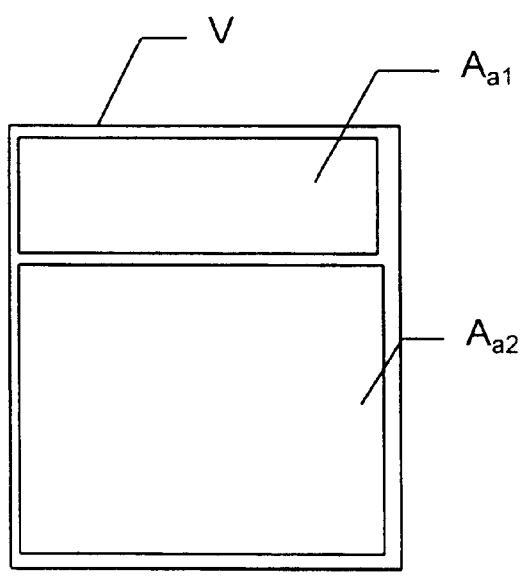
FIGS. 2a to 2c show different configurations of the display on the display means associated with the radiocommunications mobile equipment.
Figure 2B:
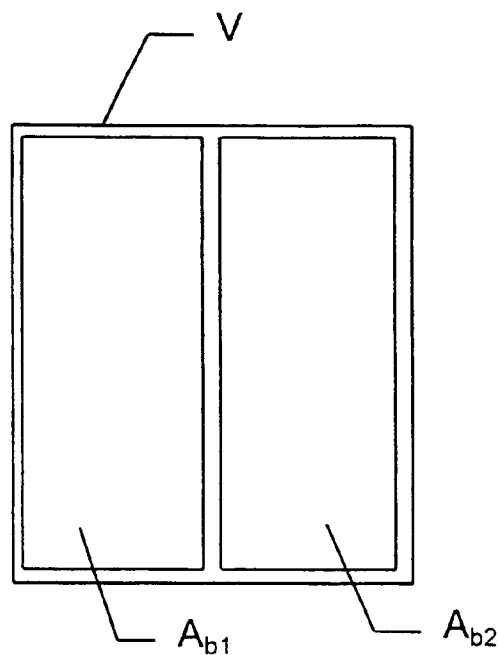
Figure 2C:
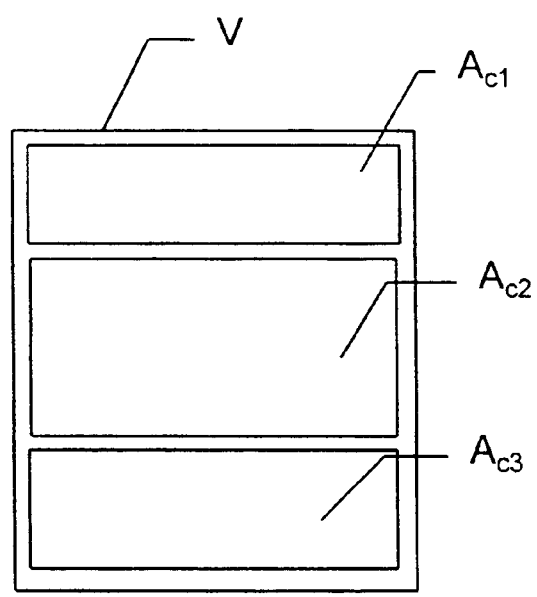

FIGS. 2a to 2c show various possible display area layouts, as a function of different combinations of these parameters.

FIGS. 2a and 2b show two layouts each having two display areas. In FIG. 2a, the areas $A_{a1}$ and $A_{a2}$ extend horizontally and are of different sizes. In FIG. 2b, the display areas $A_{b1}$ and $A_{b2}$ are identical in size and they extend vertically. Finally, the layout of FIG. 2c has three display areas $A_{c1} A_{c2}$, and $A_{c3}$ of different sizes and extending horizontally.

These various layouts can be obtained by giving appropriate values to the parameters mentioned above.

It should be observed that the list of parameters given is not exhaustive.

In a particular implementation of the invention, a second or "selection" command $C_S$ can be added to the set of proactive commands of the SIM. Its purpose is to enable a particular display area to be selected for responding to subsequently issued display commands.

This command thus has a parameter identifying a display area selected from the set of display areas as determined by the preceding "activation" command $C_E$.

The subsequent display commands are all commands taken from the proactive command set of the SIM and they are provided to cause the display means V associated with the mobile equipment ME to display something. In the set of proactive commands given by recommendation GSM 11.14, these commands are: SELECT ITEM, DISPLAY TEXT, SET UP MENU, GET INKEY, and GET INPUT. Other commands added to this set could also be concerned.

Thus, each time the SIM sends one of these commands to the ME, it directs the corresponding display to the display area that has been specified by the preceding command $C_S$.

In this way, the existing proactive commands are not modified, but can nevertheless take advantage of the display parameters.

In a particular implementation of the invention, a third or "deactivation" command $C_D$ can be added to the set of proactive commands of the SIM. The purpose of this command is to deactivate the current display parameters.

It can have the following effects:

return to a configuration having a single display area covering the entire display means V; or eliminate or one or more display areas and share the resulting space between one or more other display areas.

Naturally, other possibilities can be envisaged and the present invention should not be understood as being limited to the particular examples above.

In addition, and advantageously, the method of the invention can include a prior step of determining acceptable values for the display parameters.

This step is preferably performed during initialization of the SIM. It can be constituted by the following two substeps:

the SIM sends a command for acquiring the authorized parameters; and the ME sends said authorized parameters.

The acceptable parameters in question can have the following form:

a maximum number of display areas that can be displayed simultaneously on the display means;

a Boolean value specifying whether a vertical layout of display areas is authorized; and a Boolean value indicating whether a horizontal layout of display areas is authorized.

What is claimed is:

1. A method of parameterizing the display on display means associated with a piece of radiocommunications mobile equipment co-operating with a subscriber identity module, the method having the following steps in order:

said subscriber identity module sends a set of commands to said mobile equipment, said commands enabling the display on said display means to be parameterized; and said commands are executed by said mobile equipment on said display means, wherein said set of commands includes an activation command enabling the display means to be divided into display areas.

2. A method according to claim 1, wherein said set of commands includes a selection command enabling a particular display area to be selected on which subsequent display commands are to be displayed.

3. A method according to claim 1, wherein said set of commands includes a deactivation command enabling the current display parameters of said display means to be deactivated.

4. A method according to claim 1, wherein said activation command includes one or more parameters from the following set:

number of said display areas;

positions of said display areas;

sizes of said display areas; and border appearance of said display areas.

5. A method according to claim 1, wherein said activation command and/or said selection command and/or said deactivation command is a command taken from the set of commands of said subscriber identity module, as defined by ETSI recommendations GSM 11.11 and GSM 11.14.

6. A method according to claim 1, including a prior step of determining authorized parameters, the prior step comprising the following substeps:

the subscriber identity module sends a command for acquiring said authorized parameters; and the mobile equipment sends said authorized parameters.

7. A radiocommunications system including a subscriber identity module co-operating with a piece of mobile equipment Possessing display means, said subscriber identity module possessing means for sending a set of commands enabling the display on said display means to be parameterized, and said piece of mobile equipment possesses means for executing said commands on said display means, wherein said set of commands includes an activation command enabling the display means to be divided into display areas.

8. A radiocommunications system according to claim 7, wherein said set of commands includes a selection command enabling a particular display area to be selected on which subsequent display commands are to be displayed.

9. A radiocommunications system according to claim 7, wherein said set of commands includes a deactivation command enabling the current display parameters of said display means to be deactivated.

10. A radiocommunications system according to claim 7, wherein said activation command includes one or more parameters from the following set:

number of said display areas;

positions of said display areas;

sizes of said display areas; and border appearance of said display areas.

11. A radiocommunications system according to claim 7, wherein said activation command and/or said selection command and/or said deactivation command is a command taken from the set of commands of said subscriber identity module, as defined by ETSI recommendations GSM 11.11 and GSM 11.14.

* * * * *